UNITED STATES PATENT OFFICE.

HENRY A. KOHMAN, OF PITTSBURGH, PENNSYLVANIA, ASSIGNOR TO WARD BAKING COMPANY, OF NEW YORK, N. Y., A CORPORATION OF NEW YORK.

MANUFACTURE OF LEAVENED BREAD.

1,274,898.      Specification of Letters Patent.      Patented Aug. 6, 1918.

No Drawing.     Application filed February 15, 1918. Serial No. 217,412.

*To all whom it may concern:*

Be it known that I, HENRY A. KOHMAN, a citizen of the United States, residing at Pittsburgh, in the county of Allegheny, State of Pennsylvania, have invented certain new and useful Improvements in the Manufacture of Leavened Bread; and I do hereby declare the following to be a full, clear, and exact description of the invention, such as will enable others skilled in the art to which it appertains to make and use the same.

This invention relates to the manufacture of leavened bread and is based upon the discovery that by the addition of certain diastatic and proteolytic enzyms to the dough batch it is possible to effect an extraordinary economy in the amount of yeast normally employed in the bread-making operation, and also to lessen materially the quantity of sugar usually added in the making up of the dough batch. The employment of these enzyms, in the manufacture of leavened bread not only stimulates remarkably the activity of the yeast and its effective action in maturing the dough, but also lessens the initial rate of gas production prevailing in a normal dough batch, because a smaller quantity of yeast is required for maturing and aerating the dough in a given time. Nevertheless, the final rate of gas production (that is to say, the rate of gas production immediately preceding and including the rising of the dough in the bread pans) is practically equal to that due to the usual quantity of yeast unaided by the enzyms; consequently, the dough batch is leavened with a reduced production of carbon dioxid, and with a correspondingly lesser destruction of sugar by the yeast. Furthermore, as will hereinafter more fully appear, the preferred form in which the enzyms are incorporated in the dough batch involves a contribution of a portion of the necessary sugar to the batch, and the enzyms themselves add to the available sugar by converting a portion of the starch of the dough batch into sugar.

In the practice of the invention, the enzyms are obtained by the action, upon associated carbohydrates and proteins, of a fungus, which, under appropriate conditions, produces them in a condition to be utilized in the bread manufacture.

A suitable enzym-producing fungus is the genus *Aspergillus* and, particularly, the *Aspergillus oryzæ*, which is peculiarly effective in the production of diastatic and proteolytic enzyms of satisfactory quantity and efficiency. So also, for general uses, and especially because of the relatively low cost of the material employed, it is preferred to use as the material furnishing the carbohydrate, Indian corn or maize, which likewise supplies a suitable amount of protein material and which may be conveniently used in the form of coarse hominy. In the following description, the production of the enzyms from Indian corn or maize and by the use of the *Aspergillus oryzæ* will be particularly described, as a preferred exemplification of the method of production of the enzyms, although it will be understood that the invention is not limited thereto, but is likewise of the broader scope hereinbefore indicated.

In the production of the enzyms by the use of Indian corn or maize, a coarse hominy (that is to say, Indian corn which has been decorticated, deprived of its oily germ, and coarsely cracked, say into halves) may be employed as the starting material. The hominy grains are then caused to absorb a quantity of water sufficient to soften and to swell them to say twice or more than twice their original size. This is conveniently effected by bringing the water employed to the boiling temperature and stirring into it the coarse hominy, in proportions which may vary from say 100 parts by weight of hominy to 35 to 150 parts by weight of water,—preferably about 100 parts by weight of hominy to 75 parts by weight of water.

The hominy may be added gradually or all at once, and the water is kept hot and the cooking operation continued until the water has been sufficiently absorbed to cause the particles to become soft and to swell, as described, and nevertheless to present a fairly dry appearance. The hominy is then permitted to cool to a temperature of about 35° C. and it is found that the particles do not glue together but maintain themselves as separate individual particles. Instead of treating the hominy with water in an open vessel, it may be placed in an autoclave together with the water and heated therein under a pressure of say 20 pounds generated in the autoclave. This hastens the absorption of the water by the hominy; but, in general it is preferable to carry on the absorbing operation in an open vessel as above described, for the reason that, if cooked with pressure the subsequent action of the enzym-producing fungus upon the hominy is to convert a larger proportion of it into sugar than would otherwise be the case, and it is found that when the fungus produces too much sugar the excess of sugar interferes with the ultimate grinding of the material into a meal-like product for incorporation in the dough batch. The excess sugar causes the material to stick to the grinding apparatus to a greater or less degree and makes it more difficult to reduce it to a fine powder.

The water-swollen particles of hominy are now subjected to the action of a seeding stock, in the form of a dry powder, which powder is intimately mixed in with the hominy so as to come as thoroughly in contact therewith throughout the mass as possible. This seeding stock, in the preferred practice of the invention, is obtained by cultivating the enzym-producing fungus,—for instance, the *Aspergillus oryzæ*,—upon some suitable medium as, for instance, upon slices of bread having a moisture content of about 35%, and maintained in a moist atmosphere which may even increase somewhat the moisture content of the bread. A mycellium forms in threads which extend as a thick coat over the whole slice of bread and also within the pores thereof. The bread with the mycellium thereon is then dried slowly and the threads or filaments ultimately begin to take on a more or less bright green color due to the formation of innumerable spores throughout the entire mass. When the bread has been dried to such a degree that it can be converted into a dry powder, it is pulverized accordingly, and constitutes the dry seeding stock for the water-swollen hominy. Instead of using bread for growing the seed stock, hominy may be used cooked with say 35% of water in which preferably 4 to 8% of common salt (NaCl) is dissolved, the presence of the salt apparently favoring the production of the spores from the mycellium during the drying operation.

The particles of hominy having been inoculated with the seeding stock and being in separate individual particles, presenting externally a fairly dry appearance, are in such physical condition that they may be spread out on trays in a layer of say 1 to 3 inches in thickness, with interstitial air spaces between the individual particles. The trays may conveniently consist of galvanized-iron frames having galvanized-iron screen bottoms, and the trays may be slipped into a rack one above the other. Provision is made for free access of the air both to the top and bottom of each of the individual trays so that there may be an ample circulation of air over, below and through the entire mass. It is of particular importance that the air shall have free access into the center of the layers, during the action of the fungus thereon, inasmuch as air is an essential requirement for the growth of the fungus.

The tray containing the layers of water-swollen hominy with which the seeding stock has been intermingled as described are now placed in a room which is kept at a temperature ranging from 25° C. to 40° C. (preferably about 35° C.) and the fungus is allowed to grow for a period of say 1½ to 2 days. The atmosphere of the room is kept moist by injecting watery vapor into the room in the form of steam, so as to prevent the surface of the batch from drying up, which would interfere with the growth of the fungus. The fungus is permitted to grow, as described, for say 1½ to 2 days until the mycellium has spread throughout the whole mass, binding it all together into a cake-like body. This cake is then dried, either by atmospheric air, or by the application of heat and ventilation, or by means of a vacuum and heat. In the drying operation, it is preferred not to raise the temperature above about 70°C. for the reason that a higher temperature tends to weaken the enzyms, and for the further reason that the product darkens if heated to too high a degree, which is objectionable because it makes the product less attractive and would also darken the bread in which it is intended to incorporate the product.

The drying of the cake is sufficient to permit it to be ground up to a fine powder, constituting meal, the grinding being preferably carried to such a degree that the meal will pass through a screen of from 100 to 200 mesh to the linear inch, this fine grinding being desirable so that the particles may be of approximately the size of flour so that they may not be perceptible as such in the crust of the baked bread.

The fine meal, as thus obtained, may be employed as such in making up the dough batch and in the proportion of about one-half of 1% to 1% by weight of the flour used; or the enzyms, being soluble, may be dissolved out of the cake, either before or after grinding, and the solution thus obtained (either with or without concentration) may be used instead of the meal. In either event, there will be present, either in the meal or in the solution, a quantity of sugar produced by the action of the fungus upon the hominy, and this sugar will be available in the bread-making operation by contributing to make up the normal amount of sugar required for the bread.

Instead of using the extract, however, it is preferred to use the ground meal, for the reason that, in the dry condition, the cake and the meal obtained therefrom are not subject to fermentation or deterioration to any marked degree even though stored for a long period of time, and may be conveniently packed and transported for convenient commercial use, without the use of any preservative agents, whereas, in the absence of such preservatives, solutions are apt to ferment and sour.

In the so-called direct process of making leavened bread, about 2 to 4 pounds of the meal-like product are incorporated with 900 pounds of flour to which has been added the ordinary additional ingredients of the dough batch, such as milk, sugar, salt, shortening and yeast. It is found, however, that the employment of this amount of the meal-like product effects the saving of a large quantity of the sugar that is ordinarily required and also a saving of about 30% to 40% of the normal amount of yeast for a given period of fermentation, so that, in making up the dough batch, the sugar and yeast may be correspondingly diminished.

In the manufacture of leavened bread, the yeast has a two-fold function, to wit: (1) to aerate the bread and (2) to develop or mature the gluten. It is common practice to allow the dough to ferment approximately five hours. During this time, it is kneaded down several times, and at the end of say five hours, the dough is run through the dividing and molding machines which press out practically all of the gas, and the dough is then allowed to rise in the bread pans for about one hour.

The preliminary fermentation which goes on during the usual period of five hours is for the purpose of developing and maturing the gluten so that there will be produced a loaf of the desirable texture and porosity and of the desirable lightness in color. In the present instance, the function of the meal or solution containing the enzyms seems to be two-fold: it brings about a part of this maturing or ageing of the dough and it greatly stimulates the gas production of the yeast, which further assists in properly maturing and aerating the dough.

The saving in sugar seems to be due to the fact that the hominy from which the meal-like product is made is partially converted into sugar prior to its addition to the dough batch, and is still further converted into sugar during the process of fermentation, and that the meal-like product being rich in diastase converts some of the starches in the dough batch into sugar; so that it is possible to save approximately from one-third to one-half the amount of sugar ordinarily employed. As hereinbefore noted, there is a further saving in sugar due to the use of the meal-like product, in that a smaller quantity of yeast is required for maturing and aerating the dough in a given period of time, and it is found that with this smaller quantity of yeast the initial rate of gas production is considerably less than in a normal dough batch, while the acceleration of the gas production is such that the final rate of gas production is approximately equal to that of the usual quantity of yeast without the use of the meal-like product containing the enzyms. Consequently, the dough is leavened with a reduced total production of carbon dioxide and with a reduced destruction of sugar by the yeast.

In the so-called sponge process of making leavened bread, the meal-like product is added, in the sponge stage of the operation, to the flour, water and yeast, the quantity of yeast employed being but 60 to 70% of that normally used. So also, in the second stage of the operation, the dough batch is made up in the usual way with the exception that the amount of sugar ordinarily required is reduced to one-third to one-half of the usual amount.

Instead of the coarser hominy (which is preferred) finer hominy (such as is ordinarily known as hominy grits) may be used, but with less advantage, for the reason that the finer the hominy is, the less is the air space between the particles and consequently the more difficult it is for the due access of the necessary amount of air to permit the fungus to act effectively. If, however, the maize is reduced to a fine condition, say down to corn-meal size, the layers, during the growing operation, should be correspondingly thin.

It will be understood that other materials than Indian corn maize, similarly containing starchy and protein constituents are susceptible to the same treatment by the *Aspergillus* or other enzym-producing fungus. In addition to the grains, seeds, and the like, it is found that the legumes are also available. Thus, for example, we have used peas and beans successfully. In the use of these materials, it is well to subject them to a grinding or crushing operation which will break the outer skin or coating so as to expose the interior to the fungus. In this grinding or crushing operation, it is preferable to reduce the legumes to a coarse product so as to give better access to air during the growth of the fungus. It is necessary merely to split the dry peas and beans so that the interior surfaces of the two halves are made available for the growth of the fungus, and the splitting operation is found largely to detach or loosen the skin or coating. Smaller particles may also answer the purpose, but it is best not to reduce the particles to such a degree as to materially interfere with the circulation of air essential to the proper growth of the fungus.

The enzym product and its method of production herein described are claimed in my application Serial No. 217,413 filed of even date herewith.

What I claim is:

1. The method of making leavened bread, which comprises bringing into admixture with flour, yeast and other ingredients of the dough batch, diastatic and proteolytic enzyms produced by the action of an enzym-producing fungus upon carbohydrate and protein substances, and fermenting the batch; substantially as described.

2. The method of making leavened bread, which comprises bringing into admixture with the flour, yeast and other ingredients of the dough batch, a meal-like product containing diastatic and proteolytic enzyms produced by the action of an enzym-producing fungus upon carbohydrate and protein substances, and fermenting the batch; substantially as described.

3. The method of making leavened bread, which comprises bringing into admixture with the flour, yeast and other ingredients of the dough batch, diastatic and proteolytic enzyms produced by the action of an enzym-producing fungus upon starchy and protein substances, and fermenting the batch; substantially as described.

4. The method of making leavened bread, which comprises bringing into admixture with the flour, yeast and other ingredients of the dough batch, a meal-like product containing diastatic and proteolytic enzyms produced by the action of an enzym-producing fungus upon a cereal, and fermenting the batch; substantially as described.

5. The method of making leavened bread, which comprises bringing into admixture with the flour, yeast and other ingredients of the dough batch, a meal-like product containing diastatic and proteolytic enzyms produced by the action of an enzym-producing fungus upon Indian corn or maize, and fermenting the batch; substantially as described.

6. The method of making leavened bread, which comprises bringing into admixture with the flour, yeast and other ingredients of the dough batch, a meal-like product containing diastatic and proteolytic enzyms produced by the action of a fungus of the genus *Aspergillus* upon such materials as grains, seeds, maize, legumes, or the like and fermenting the batch; substantially as described.

7. The method of making leavened bread, which comprises bringing into admixture with the flour, yeast and other ingredients of the dough batch, a meal-like product containing diastatic and proteolytic enzyms produced by the action of *Aspergillus oryzæ* upon such materials as grains, seeds, maize, legumes, or the like and fermenting the batch; substantially as described.

In testimony whereof I affix my signature.

HENRY A. KOHMAN.